US011651559B2

(12) United States Patent
Bovensiepen

(10) Patent No.: US 11,651,559 B2
(45) Date of Patent: May 16, 2023

(54) AUGMENTED REALITY METHOD FOR SIMULATING WIRELESS SIGNAL, AND APPARATUS

(71) Applicant: Siemens Aktiengesellschaft, Munich (DE)

(72) Inventor: Daniel Bovensiepen, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 48 days.

(21) Appl. No.: 17/058,771

(22) PCT Filed: Jun. 1, 2018

(86) PCT No.: PCT/CN2018/089647
§ 371 (c)(1),
(2) Date: Nov. 25, 2020

(87) PCT Pub. No.: WO2019/227485
PCT Pub. Date: Dec. 5, 2019

(65) Prior Publication Data
US 2021/0201583 A1    Jul. 1, 2021

(51) Int. Cl.
*G06N 20/00* (2019.01)
*G06T 7/593* (2017.01)
(Continued)

(52) U.S. Cl.
CPC ........... *G06T 19/006* (2013.01); *G06N 20/00* (2019.01); *G06T 7/593* (2017.01); *H04W 64/003* (2013.01); *H04W 64/006* (2013.01); *H04W 84/18* (2013.01)

(58) Field of Classification Search
None
See application file for complete search history.

(56) References Cited

U.S. PATENT DOCUMENTS 6,630,915 B1 * 10/2003 Flood ................. G09B 9/003
359/630
9,264,799 B2 * 2/2016 Rosca ................. H04R 3/005
(Continued)

FOREIGN PATENT DOCUMENTS

CN      101741483 A    6/2010
CN      103400409 B    8/2016
(Continued)

OTHER PUBLICATIONS

Akarsh Aggarwal, Manoj Kumar, "Image Surface Texture Analysis and Classification Using Deep Learning", 2020, Multimedia Tools and Applications, 80:1289-1309, https://doi.org/10.1007/s11042-020-09520-2 (Year: 2020).*

(Continued)

*Primary Examiner* — Michael J Cobb
(74) *Attorney, Agent, or Firm* — Harness, Dickey & Pierce, P.L.C.

(57) ABSTRACT

Disclosed are an augmented reality method and device for simulating a wireless signal. The method includes: capturing an environment, and forming a three-dimensional virtual representation of the environment; determining a parameter related to a virtual wireless device, the virtual wireless device being a virtual wireless signal source or a reflector; positioning the virtual wireless device in the environment, and simulating virtual wireless signal coverage in the three-dimensional virtual representation of the environment according to the positioning, the parameter, and the three-dimensional virtual representation of the environment; and adding, to the environment, a marker representing the virtual wireless signal coverage to serve as an augmented reality image for display. A wireless signal emission is simulated in combination with an augmented reality technology, so that a user having no professional knowledge of a wireless (Continued)

technology can accurately and quickly estimate behaviors of a wireless system at each position of a desired space.

17 Claims, 3 Drawing Sheets

(51) Int. Cl.
*G06T 19/00* (2011.01)
*H04N 13/239* (2018.01)
*H04N 13/00* (2018.01)
*H04W 16/20* (2009.01)
*H04W 64/00* (2009.01)
*H04W 84/18* (2009.01)

(56) References Cited

U.S. PATENT DOCUMENTS

| | | | |
|---|---|---|---|
| 10,559,121 B1* | 2/2020 | Moudgil | G06T 15/50 |
| 11,410,399 B1* | 8/2022 | Valenza | H04W 16/20 |
| 2004/0132466 A1* | 7/2004 | Kennedy, Jr. | H04W 64/00 455/560 |
| 2005/0052745 A1* | 3/2005 | Lee | G02B 5/1861 359/567 |
| 2010/0296409 A1* | 11/2010 | Fok | H04W 24/00 370/252 |
| 2010/0321389 A1* | 12/2010 | Gay | G06T 17/00 345/427 |
| 2012/0249741 A1* | 10/2012 | Maciocci | G06T 19/006 348/51 |
| 2014/0002443 A1* | 1/2014 | Cunningham | G06T 19/006 345/419 |
| 2014/0055490 A1* | 2/2014 | Mule | G06T 19/006 345/633 |
| 2015/0312774 A1* | 10/2015 | Lau | G05D 1/102 455/446 |
| 2017/0367766 A1* | 12/2017 | Mahfouz | A61B 17/155 |
| 2018/0060476 A1 | 3/2018 | Kasch et al. | |
| 2018/0139622 A1* | 5/2018 | Cornforth | H04W 24/00 |
| 2018/0306924 A1* | 10/2018 | Olson | G01S 17/42 |
| 2019/0034765 A1* | 1/2019 | Kaehler | G06K 9/6257 |
| 2019/0043260 A1* | 2/2019 | Anderson | G06V 40/20 |
| 2019/0259205 A1* | 8/2019 | Nissinen | G06T 19/006 |
| 2020/0067341 A1* | 2/2020 | Glover | H02J 50/20 |
| 2020/0068413 A1* | 2/2020 | Hadley | H04W 16/20 |
| 2020/0265288 A1* | 8/2020 | Volkerink | G06K 19/07773 |

FOREIGN PATENT DOCUMENTS

| | | |
|---|---|---|
| CN | 106851674 A | 6/2017 |
| CN | 106874567 A | 6/2017 |

OTHER PUBLICATIONS

International Search Report PCT/ISA/210 for International Application No. PCT/CN2018/089647 dated Feb. 15, 2019.
Written Opinion of the International Searching Authority PCT/ISA/237 for International Application No. PCT/CN2018/089647 dated Feb. 15, 2019.
Extended European Search Report dated Dec. 14, 2021.

* cited by examiner

AUGMENTED REALITY METHOD FOR SIMULATING WIRELESS SIGNAL, AND APPARATUS

PRIORITY STATEMENT

This application is the national phase under 35 U.S.C. § 371 of PCT International Application No. PCT/CN2018/089647, which has an International filing date of Jun. 1, 2018, which designated the United States of America, the entire contents of which are hereby incorporated herein by reference.

BACKGROUND

Field

Embodiments of invention relate to simulation of characteristics of a wireless signal system, and in particular, to an augmented reality method and device for simulating a wireless signal, and a non-transitory computer-readable storage medium.

Background

Nowadays, it can be said that wireless transmission and a wireless communication system are ubiquitous. People often carry communication devices that use various wireless technology standards for communications. Due to the excellent availability of wireless communications, a wireless signal has become a medium for most communications today. However, although wireless communications have been widely applied for a long time, related technologies and application skills are still relatively complex and it is difficult for a user to master the related technologies and application skills. For example, even an expert in the industry may not be able to cope with issues related to layout of the wireless system, wireless signal coverage, and interference even mastering various new technologies and new standards.

Because of the foregoing reasons, a device manager and a terminal user, etc. in the wireless system may not be able to arrange related devices in a certain surrounding environment in an appropriate manner in practical applications, resulting in insufficient wireless signal coverage, poor signal intensity, and serious signal interference, etc. in a use area of wireless communication or transmission.

SUMMARY

In order to resolve the foregoing problems, a user of a wireless system may directly seek help from an expert who is familiar with a specific wireless communication system, standard, or technology to arrange or set up the wireless system and a device in the wireless system. In addition, the existing method further includes wireless signal survey tools and wireless signal simulation application programs that are provided to facilitate the user to resolve the foregoing problems on its own. However, the inventors have discovered that such tools and application programs require the users to have considerable professional knowledge, and it is difficult for a general user to use such tools and application programs correctly. The inventors discovered that another problem arisen therefrom further includes that the user of the wireless system still needs to spend a lot of time and efforts on determining behaviors of the wireless system at each position in a desired space to determine whether working conditions in the space are ideal. In addition, in terms of a wireless signal simulation application program, another problem is that if an approximate surrounding environment of the wireless system is not close enough to a real situation, a final simulation result will also be unsatisfactory, leading to a deviation in judgement.

Therefore, the inventors that there is an urgent need for a more complete solution, so that the user of a wireless system who does not have relevant professional knowledge and skills can properly arrange related devices on its own in the wireless system according to surrounding environmental conditions, thereby providing excellent wireless signal quality within a desired working range or space.

At least one embodiment of the present invention proposes an augmented reality method and device for simulating a wireless signal, and a non-transitory computer-readable storage medium suitable for implementing the method in order to resolve a technical problem of overcoming a deficiency in the prior art that related devices of a wireless system must be arranged by relying on a person who is familiar with relevant wireless technologies to provide excellent wireless signal quality in a desired range or space.

At least one embodiment of the present invention resolves the foregoing technical problems by using the following technical solutions.

According to one embodiment of the present invention, an augmented reality method for simulating the wireless signal simulation is provided, including:

capturing an environment, and forming a three-dimensional virtual representation of the environment;

determining a parameter related to a virtual wireless device, where the virtual wireless device is a virtual wireless signal source or a reflector;

positioning the virtual wireless device in the environment, and simulating virtual wireless signal coverage in the three-dimensional virtual representation of the environment according to the positioning, the parameter, and the three-dimensional virtual representation of the environment;

and adding, to the environment, a marker representing the virtual wireless signal coverage, to serve as an augmented reality image for display.

According to another embodiment of the present invention, a non-transitory computer-readable storage medium storing a computer instruction is provided, the computer instruction, when executed by a processor, causing the processor to implement at least one embodiment of the augmented reality method.

According to another embodiment of the present invention, an augmented reality device for simulating a wireless signal simulation is provided, including:

an environment capturing module configured to capture an environment and form a three-dimensional virtual representation of the environment;

a setting module configured to determine a parameter related to a virtual wireless device, where the virtual wireless device is a virtual wireless signal source or a reflector, and the virtual wireless device is positioned in the environment;

a wireless signal simulating module configured to simulate a virtual wireless signal coverage in the three-dimensional virtual representation of the environment according to the positioning, the parameter, and the three-dimensional virtual representation of the environment; and an augmenting module configured to add, to the environment, a marker representing the virtual wireless signal coverage, to serve as an augmented reality image for display.

According to another embodiment of the present invention, an augmented reality device for simulating a wireless signal simulation is provided, including:

a capturing apparatus configured to capture an environment and form a three-dimensional virtual representation of the environment;

a display apparatus configured to display an augmented reality image;

a processor; and a non-transitory computer-readable storage medium storing a computer instruction, where the processor, the non-transitory computer-readable storage medium, and the computer instruction are configured to cause the augmented reality apparatus to implement at least the following steps:

determining, according to an input of a user, a parameter related to the virtual wireless device, where the virtual wireless signal device is a virtual wireless signal source or a reflector;

positioning the virtual wireless device in the environment, and simulating virtual wireless signal coverage in the three-dimensional virtual representation of the environment according to the positioning, the parameter, and the three-dimensional virtual representation of the environment;

and adding, to the environment, a marker representing the virtual wireless signal coverage to serve as an augmented reality image.

BRIEF DESCRIPTION OF THE DRAWINGS

The following figures are only intended to give schematic illustrations and explanations of the present invention but are not intended to limit a scope of the present invention.

DETAILED DESCRIPTION OF THE EXAMPLE EMBODIMENTS

Figure 1:
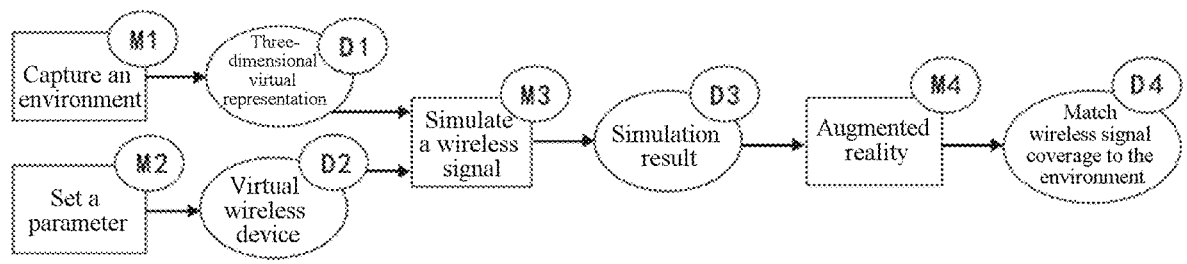
FIG. 1 is a schematic flowchart of an augmented reality method for wireless simulation according to a preferred implementation embodiment of the present invention.

According to one embodiment of the present invention, an augmented reality method for simulating the wireless signal simulation is provided, including:

capturing an environment, and forming a three-dimensional virtual representation of the environment;

determining a parameter related to a virtual wireless device, where the virtual wireless device is a virtual wireless signal source or a reflector;

positioning the virtual wireless device in the environment, and simulating virtual wireless signal coverage in the three-dimensional virtual representation of the environment according to the positioning, the parameter, and the three-dimensional virtual representation of the environment;

and adding, to the environment, a marker representing the virtual wireless signal coverage, to serve as an augmented reality image for display.

Preferably, the virtual wireless device and the marker are added to the environment to serve as the augmented reality image.

Preferably, the parameter includes a part or all of a type, a frequency, an antenna type, and an antenna gain of the wireless signal source.

Preferably, the adding the marker to the environment includes: drawing the marker based upon the three-dimensional virtual representation of the environment in one of the following methods:

drawing a pattern of the virtual wireless signal coverage on the ground of the environment;

drawing a pattern of the virtual wireless signal coverage on a photo of the environment; and dividing the environment into a plurality of areas, and marking virtual wireless signal coverage of each of the areas.

Preferably, the capturing an environment, and forming a three-dimensional virtual representation of the environment includes:

performing camera shooting on a real environment at different angles from different positions, so as to obtain at least two images for each scenario; and measuring depth information of each pixel in the image based on a triangulation method for a stereo image.

Preferably, the capturing an environment, and forming a three-dimensional virtual representation of the environment further includes:

learning, by using a preset training set for machine learning to match optical information included in an image and a material of each surface included in the image, the training set through a machine learning algorithm, and matching the material of each surface in the image based on the optical information included in the image; and simulating virtual wireless signal coverage in the three-dimensional virtual representation of the environment according to the positioning, the parameter, the three-dimensional virtual representation of the environment, and the matched material of each surface in the image.

According to another embodiment of the present invention, a non-transitory computer-readable storage medium storing a computer instruction is provided, the computer instruction, when executed by a processor, causing the processor to implement at least one embodiment of the augmented reality method.

Preferably, the determining a parameter related to a virtual wireless device is to determine the parameter according to an input of a user.

According to another embodiment of the present invention, an augmented reality device for simulating a wireless signal simulation is provided, including:

an environment capturing module configured to capture an environment and form a three-dimensional virtual representation of the environment;

a setting module configured to determine a parameter related to a virtual wireless device, where the virtual wireless device is a virtual wireless signal source or a reflector, and the virtual wireless device is positioned in the environment;

a wireless signal simulating module configured to simulate a virtual wireless signal coverage in the three-dimensional virtual representation of the environment according to the positioning, the parameter, and the three-dimensional virtual representation of the environment; and an augmenting module configured to add, to the environment, a marker representing the virtual wireless signal coverage, to serve as an augmented reality image for display.

According to another embodiment of the present invention, an augmented reality device for simulating a wireless signal simulation is provided, including:

a capturing apparatus configured to capture an environment and form a three-dimensional virtual representation of the environment;

a display apparatus configured to display an augmented reality image;

a processor; and a non-transitory computer-readable storage medium storing a computer instruction, where the processor, the non-transitory computer-readable storage medium, and the computer instruction are configured to cause the augmented reality apparatus to implement at least the following steps:

determining, according to an input of a user, a parameter related to the virtual wireless device, where the virtual wireless signal device is a virtual wireless signal source or a reflector;

positioning the virtual wireless device in the environment, and simulating virtual wireless signal coverage in the three-dimensional virtual representation of the environment according to the positioning, the parameter, and the three-dimensional virtual representation of the environment; and adding, to the environment, a marker representing the virtual wireless signal coverage to serve as an augmented reality image.

Preferably, the virtual wireless device and the marker are added to the environment to serve as the augmented reality image.

Preferably, the capturing apparatus and the display apparatus have a common see-through component or mutually independent see-through components.

Preferably, the augmented reality device is a head-mounted device or a handheld device.

Preferably, the capturing apparatus includes several camera apparatuses arranged to have different positions and different shooting angles, or the capturing apparatus includes a camera apparatus and an inertial sensor, where the inertial sensor is configured to measure motion of the camera apparatus during shooting;

the processor, the non-transitory computer-readable storage medium, and the computer instruction are further configured to cause the augmented reality apparatus to implement at least the following steps:

measuring, based on a triangulation method of a stereo image, depth information of each pixel in at least two images captured for a same scenario, and forming a three-dimensional virtual representation of the environment based on the depth information and two-dimensional information included in the image.

Preferably, the processor, the non-transitory computer-readable storage medium, and the computer instruction are further configured to cause the augmented reality apparatus to implement at least the following steps:

learning, by using a preset training set for machine learning to match optical information included in an image and a material of each surface included in the image, the training set through a machine learning algorithm, and matching the material of each surface in the image based on the optical information included in the image; and simulating virtual wireless signal coverage in the three-dimensional virtual representation of the environment according to the positioning, the parameter, the three-dimensional virtual representation of the environment, and the matched material of each surface in the image.

Based upon conforming to common knowledge in the field, the foregoing preferred conditions may be combined arbitrarily to obtain preferred embodiments of the present invention.

Positive and progressive effects of the present invention are:

according to an embodiment of the present invention, wireless signal emission is simulated in combination with an augmented reality technology, so that a user having no professional knowledge of a wireless technology can accurately and quickly estimate behaviors of a wireless system at each position of a desired space or range, thereby making adjustments easily to provide good and even excellent wireless signal quality in the desired space or range.

In order to have a clearer understanding of the technical features, the objectives, and the effects of the present invention, specific implementations of the present invention are now illustrated with reference to the accompanying drawings.

The following describes the exemplary embodiments of the present invention in detail with reference to the accompanying drawings. The following descriptions are exemplary, but are not intended to limit the present invention. Any other similar case shall fall within the protection scope of the present invention.

Referring to FIG. 1, an augmented reality method for simulating a wireless signal simulation according to some implementations of the present invention includes:

capturing an environment in operation M1, and forming a three-dimensional virtual representation D1 of the environment;

determining a parameter (e.g., setting the parameter in operation M2) related to a virtual wireless device D2, where the virtual wireless device is a virtual wireless signal source or a reflector;

positioning the virtual wireless device in the environment, and simulating virtual wireless signal coverage in operation M3 in the three-dimensional virtual representation of the environment according to the positioning, the parameter, and the three-dimensional virtual representation of the environment to obtain a simulation result D3; and adding, to the environment, a marker representing the virtual wireless signal coverage, to serve as an augmented reality image for display in operation M4.

It should be understood that an existing augmented reality algorithm and a novel architecture designed based on this basis are used in the present invention. The environment may be captured by using, for example, various sensing apparatuses (for example, a plurality of optical sensors). For example, an optical see-through component or a video see-through component employed in an existing augmented reality system may be used to capture the environment. The environment herein may be understood as an environment in which an apparatus or component used to capture the environment is located at the time, that is, a space or range where a behavior of radio propagation in a specific radio system is to be studied. For example, the environment may be a room, a space composed of a plurality of rooms, a hall, etc.

According to some preferred implementations embodiments of the present invention, during implementation of the augmented reality method, the capturing of the environment and the subsequent formation and display of the augmented reality image may be implemented by a portable device or mobile terminal device held by a user. An image-based three-dimensional reconstruction algorithm may be used to capture a real environment and transmit relevant information to virtual representation of the real environment.

According to a type of preferred implementations embodiments, in implementation of the augmented reality method, a triangulation method based on a stereo image may be used to capture the environment to form a virtual representation, and information may be added based upon the virtual representation to form the augmented reality image. For example, a portable device held by a user may be equipped with a plurality of cameras or camera apparatuses that shoot the real environment at different positions and from different angles. Take two cameras as an example, when the two cameras capture photos of a same scenario in the real environment from different positions, due to different shooting angles of the two cameras, a depth of each pixel in a two-dimensional image is triangulated according to different positions of pixels in two images (two photos) in the same scenario. Therefore, although an image captured by a single camera or camera apparatus is two-dimensional, depth information obtained through triangulation may be supplemented on this basis to obtain three-dimensional information required to form a three-dimensional virtual representation of the real environment.

According to another preferred implementation embodiment of the present invention, when the portable device is only equipped with a single camera apparatus, the triangulation method based on the stereo image may still be used to capture the environment to form the virtual representation. In such implementation, a single camera apparatus is required to continuously capture photos as a user moves and changes a shooting angle, and during shooting, an inertial sensor such as an acceleration sensor is used to record sensor data during shooting. Through such sensor data, a shooting position and angle corresponding to each photo (or each image for photography) during the shooting may be calculated. According to such information, a depth of each pixel in a two-dimensional image may be triangulated in the different positions of the pixels in the two images of the same scenario according to a method similar to the method in the foregoing preferred embodiment, so as to obtain three-dimensional information required for a three-dimensional virtual representation of the real environment.

According to the foregoing two types of preferred implementation embodiments of the present invention, depth information of a pixel may be further provided based upon a captured two-dimensional image by using an image-based three-dimensional reconstruction algorithm and three-dimensional point cloud data of the real environment is obtained accordingly. The three-dimensional point cloud data or a three-dimensional point cloud model may provide information about each reflection point of radio simulation in the environment.

Further, based upon the foregoing image-based three-dimensional reconstruction algorithm, a triangular mesh algorithm such as "greedy surface triangulation" may be applied to provide a surface for the three-dimensional virtual representation of the environment.

According to some further preferred implementation embodiments of the present invention, based on the image-based three-dimensional reconstruction algorithm, optical information (such as a color or pattern of a surface, etc.) included in a captured image may be used to estimate a material of a surface in the environment. For example, a large number of images or photos similar to a captured environment may be first used to construct a training set, and then a machine learning algorithm such as a neural network algorithm may be used to learn the training set, so that a certain type or types of optical information included in the captured image may be used as a matching basis to estimate the corresponding material of the surface. In view of different performances of radio reflections on different materials (for example an absorbing material or a non-absorbing material), estimation of surface material will help improve accuracy of a simulation result of radio simulation of the present invention.

In some implementation embodiments of the present invention, the determining a parameter related to a virtual wireless device may be, for example, using a user interface to enable the user to set a parameter required for simulation. According to some preferred implementation embodiments of the present invention, the determined parameter includes a type, a frequency, an antenna type, and an antenna gain of the wireless signal source. Through the determination of the parameter and positioning of the virtual wireless device, information about the virtual wireless device required for the simulation is determined.

According to the foregoing obtained two pieces of information, that is, the three-dimensional virtual representation of the environment and the information about the virtual wireless device, wireless signal coverage in the environment may be simulated through an operation. A related known algorithm may be used as an algorithm of a simulated operation. A result related to the wireless signal coverage obtained through simulation is used as information for augmented reality. According to some preferred embodiments, the virtual wireless device and the marker are added to the environment to serve as the augmented reality image, facilitating intuitive observation of the user.

According to some preferred implementation embodiments of the present invention, through a user interface of a portable device held by the user, a wireless power supply may be "virtually placed or located" at a specific position in the environment, which will determine a position of the wireless power supply, that is, coordinates $(X_1, Y_1, Z_1)$ thereof. On this basis, a power level of coordinates $(X_n, Y_n, Z_n)$ may be calculated in a three-dimensional virtual representation of a complete real environment by using a radio simulation algorithm. To this end, for example, a frequency (for example, 60 GHz) may be considered first for the radio simulation algorithm, and then a matching path loss value D4 is selected from a predefined data set, and signal strength of coordinates $(X_n, Y_n, Z_n)$ is calculated from each angle by using the path loss value, such as a distance measurement result from $(X_1, Y_1, Z_1)$ to $(X_n, Y_n, Z_n)$. According to a distance between the coordinates, the path loss value may be applied and the signal strength of specific coordinates $(X_n, Y_n, Z_n)$ may be acquired.

Each coordinate in the three-dimensional virtual representation of the real environment needs to go through the foregoing calculation process, and the calculation of the signal strength of each coordinate should include calculation in the following two aspects in consideration of potential signal strength values of the coordinates: 1. direct signal strength, that is, signal strength from coordinates $(X_1, Y_1, Z_1)$ to coordinates $(X_n, Y_n, Z_n)$; 2. reflected signal strength, for example, all reflections (paths) of coordinates $(X_1, Y_1, Z_1)$ and coordinates $(X_n, Y_n, Z_n)$ are found by using ray-tracing, and each reflection (path) has corresponding reflected signal strength.

After the foregoing calculation process has traversed all direct and indirect paths between the coordinates $(X_1, Y_1, Z_1)$ and the coordinates $(X_n, Y_n, Z_n)$, calculation results of all individual paths may be summarized to calculate total signal strength of the coordinates $(X_n, Y_n, Z_n)$.

It should be understood that the augmented reality system includes display of the real world. Therefore, the augmented reality system has, during display of the augmented reality image, an angle of view for displaying the real world. This angle of view is related to a position of the user in the real world and an angle and a field of view of the user toward the real world through the augmented reality device. In the foregoing method, a marker indicating the virtual wireless signal cover may be added to the environment based on an angle of view of an environment image captured by a camera in the augmented reality device. The angle of view mentioned herein should not be understood as an angle formed by lines of sight in a narrow sense, but is determined by a position in the environment, an angle of looking at the real world, and a field of view.

Therefore, an augmented reality image finally displayed in front of the user's eyes may be the real environment as viewed by the user in a current angle of view and a marker representing the virtual wireless signal coverage added based upon this. Through such augmented reality image, the wireless signal coverage or distribution in a surrounding environment of the user may be visually expressed in the real world in a way that is easy to understand for ordinary people who do not know relevant professional knowledge. In addition, the user may conveniently observe and compare the wireless signal coverage or distribution in different areas at different locations within a range of the surrounding environment from different angles. As a result, even in the most demanding environment, an ordinary user may also more comprehensively and quickly consider the best position of a wireless signal source or a reflector in a desired area to provide excellent wireless signal quality in the area.

In the foregoing method, the user usually only needs to set parameters related to the virtual wireless device. Such parameters may usually be selected from a real optional wireless device that the user is considering, and therefore the user may not meet very high requirements for professional knowledge.

In order to avoid as much as possible the user's inability to make good use of the augmented reality image because of lack of relevant knowledge, according to some preferred embodiments, the marker is drawn based upon the three-dimensional virtual representation of the environment in following methods.

For example, on the ground of the environment, a pattern of the virtual wireless signal coverage is drawn, for example, density of drawn lines is used to reflect a degree of the virtual wireless signal coverage or strength of the signal, so as to facilitate the user's visual observation of a difference in wireless signal coverage in all (horizontal) areas.

For another example, a pattern of the virtual wireless signal coverage may be drawn on a photo of the environment.

For another example, the environment may be divided into a plurality of (two-dimensional) areas or a plurality of (three-dimensional) spaces in a grid shape, and the virtual wireless signal coverage of each of the areas or each of the spaces may be marked. For example, the virtual wireless signal coverage or the strength of the signal is reflected by a marked value.

Some implementations of the present invention provide a non-transitory computer-readable storage medium storing a computer instruction that, when executed by a processor, causes the processor to implement the foregoing augmented reality method. This also means that at least one type of the implementations of the present invention may be an application program installed in devices such as a smart phone, a tablet computer, or a smart wearable device, etc.

An augmented reality device for radio simulation provided by some implementations of the present invention is introduced as follows. The augmented reality device includes:

a capturing apparatus configured to capture an environment and form a three-dimensional virtual representation of the environment; and a display apparatus configured to display an augmented reality image.

The capturing apparatus may include a plurality of sensors, such as an optical sensor. The capturing apparatus uses sensors to capture relevant information of a real environment, such as distance information, and converts the relevant information into a three-dimensional virtual representation of the environment. In other words, the capturing apparatus may be any device that obtains sensing data by sensing the real world and constructs a three-dimensional virtual world accordingly.

The display apparatus for displaying an augmented reality image may be designed based on an optical see-through technology or a video see-through technology used in an existing augmented reality system. It should be understood that the capturing apparatus and the display apparatus may have a common component, such as a part of an optical component (e.g. a see-through component) in the augmented reality device, both as a part of a component related to environment capturing in the capturing apparatus, and as a part of a component in the display apparatus for displaying the real environment in the augmented reality image.

The augmented reality device further includes a processor and a non-transitory computer-readable storage medium storing a computer instruction configured to cause the augmented reality apparatus to implement at least the following steps:

determining, according to an input of a user, a parameter related to a virtual wireless device, where the virtual wireless device is a virtual wireless signal source or a reflector;

positioning the virtual wireless device in the environment, and simulating virtual wireless signal coverage in the three-dimensional virtual representation of the environment according to the positioning, the parameter, and the three-dimensional virtual representation of the environment; and adding, to the environment, a marker representing the virtual wireless signal coverage to serve as an augmented reality image.

Figure 5:
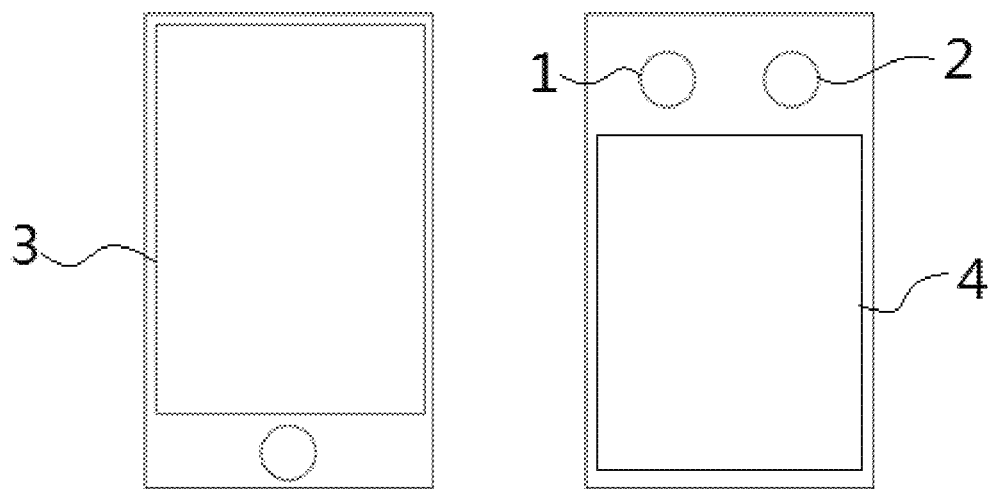
FIG. 5 is a schematic structural diagram of a portable augmented reality device according to a preferred implementation embodiment of the present invention.

Referring to FIG. 5, according to some preferred implementations of the present invention, an augmented reality device may be used in the form of two portable devices. One portable device may be equipped with a first camera 1 and a second camera 2 in different positions to perform shooting at different angles, and a user interface 4. In addition, images of a same scenario captured by the two cameras are calculated through the foregoing image-based three-dimensional reconstruction algorithm to obtain depth information, or the two images go through three-dimensional processing to form a three-dimensional virtual representation. Another portable device has a user interface 3. The user interface 3 may present a virtual representation obtained based on a three-dimensional reconstruction of a two-dimensional image, and allows the user to input an instruction to "virtually place or position" a wireless power supply at a specific position in the environment. After simulation of the wireless signal coverage, an augmented reality image including a simulation result of the wireless signal coverage is formed and displayed in the user interface 3.

It should be understood that calculation of the radio simulation may be performed either by a portable device or on a computing unit separate from the portable device (for example, implemented through a cloud computing technology). In an implementation in which the portable device completes related calculation work, the portable device requires additional support for computing performance and battery power. In an implementation in which separated calculation units complete related calculations, although the portable device requires an additional communication interface, requirements for the computing performance and battery power are significantly reduced. In addition, in a calculation method completed such as in the cloud, accuracy, precision or efficiency of simulated calculation is increased, and product performance may be improved conveniently without the need to upgrade the portable devices scattered in hands of many users.

Based on the foregoing preferred implementation of the present invention described above with reference to FIG. 5, it should further be understood that, optionally, the first camera 1 and the second camera 2 may further be replaced by one camera and an inertial sensor, or optionally, a number of the camera and the inertial sensors may further be changed. Correspondingly, for adaptive adjustment of the applied image-based three-dimensional reconstruction algorithm, please refer to the previous description, which will not be repeated herein again.

For adding of a marker indicating the virtual wireless signal coverage to the environment to serve as an augmented reality image, information adding and display may be performed based on a current angle of view of a display apparatus or a capturing apparatus. The term "current" is used herein only to distinguish an angle of view during display of the augmented reality image from an angle of view that may have during capturing of the environment.

Preferably, the virtual wireless device itself and the marker may be added to the environment to serve as the augmented reality image.

It should be understood that although it is not mentioned in the foregoing description of a computer instruction stored in the augmented reality device, the stored computer instruction may further include an instruction for configuring and/or controlling the capturing apparatus and the display apparatus.

The augmented reality device may be a fixed device, but preferably, the augmented reality device is generally in the form of a head-mounted device or a handheld device as a whole. When the head-mounted device is used, a current angle of view of the display apparatus or the capturing apparatus may be consistent with an angle of view of the user itself. When the head-mounted device is used, a current angle of view of the display apparatus or the capturing apparatus may be significantly different from an angle of view of the user itself.

For example, the augmented reality device in the form of the handheld device is used to exemplify use of the device by the user to facilitate understanding as follows.

Figure 2:
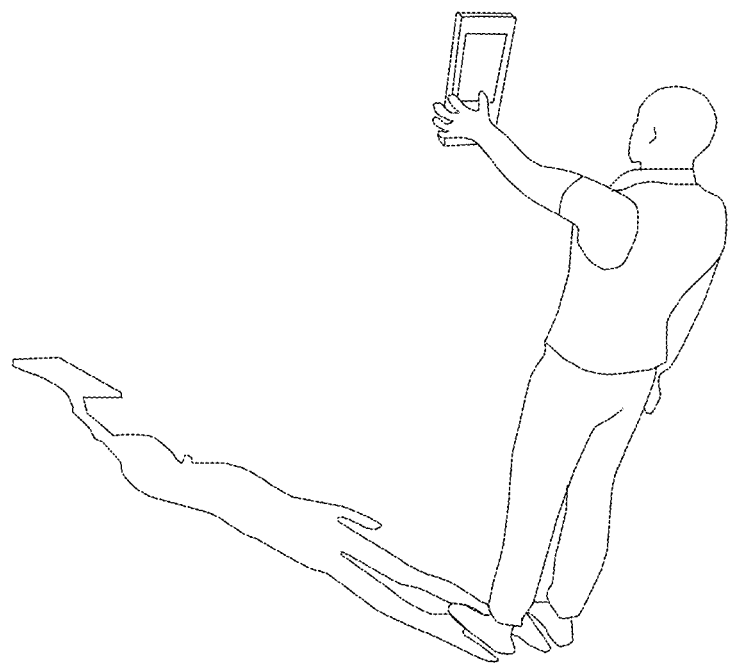
FIG. 2 is a schematic diagram of a user state in which a user uses an augmented reality device according to a preferred implementation embodiment of the present invention.

Referring to FIG. 2, the user is in an environment where the user intends to simulate wireless signal emission and holds a handheld augmented reality device. The augmented reality device converts a surrounding environment into a three-dimensional virtual representation through a sensing apparatus.

Figure 3:
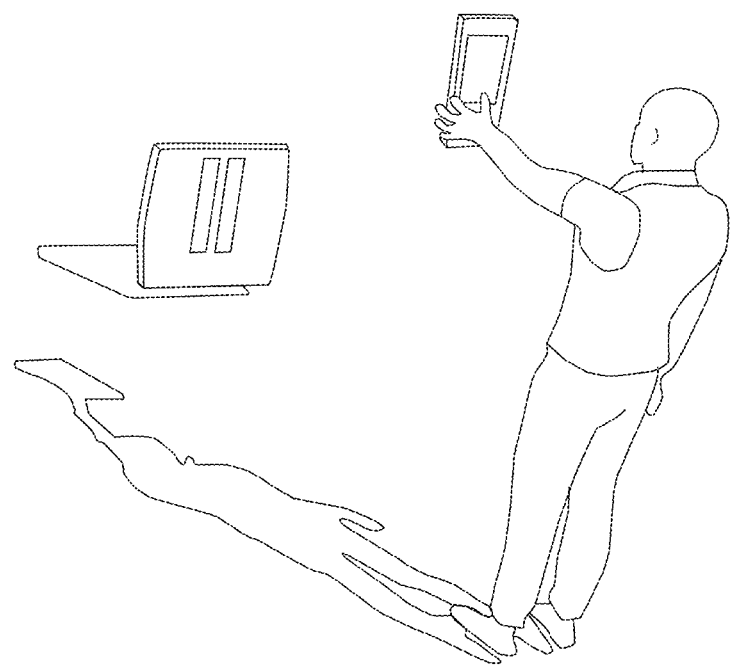
FIG. 3 is a schematic diagram of a user state in which a user uses an augmented reality device according to a preferred implementation embodiment of the present invention.

Referring to FIG. 3, the user may position and set the virtual wireless signal source or reflector in a virtual environment drawn on the real environment, and set related parameters, such as a type, a frequency, an antenna type, and an antenna gain of a wireless signal source.

Figure 4:
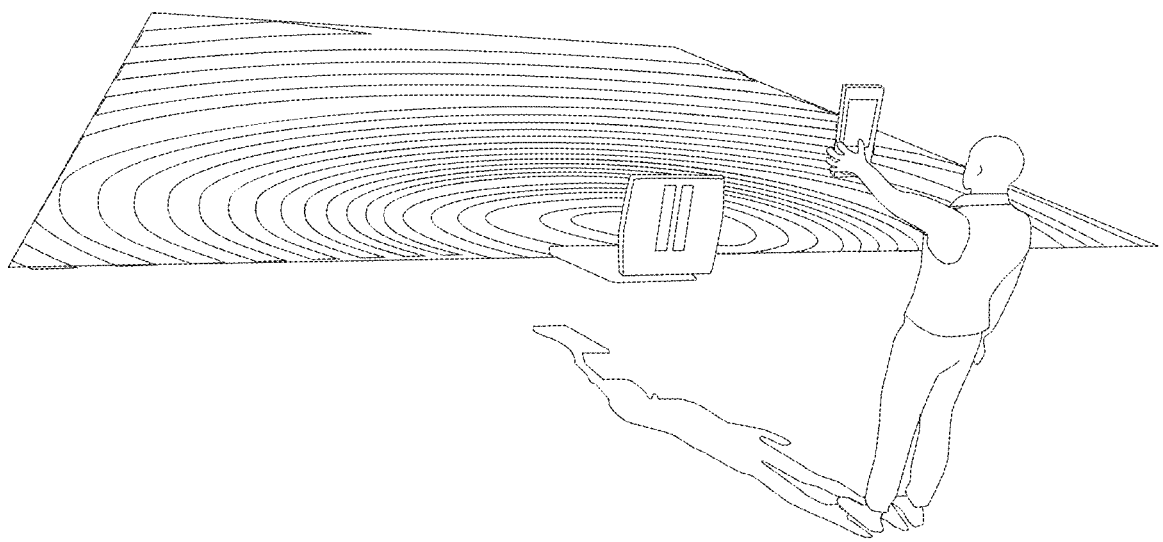
FIG. 4 is a schematic diagram of a user state in which a user uses an augmented reality device according to a preferred implementation embodiment of the present invention.

Referring to FIG. 4, the user may enable simulation of the wireless signal emission of the augmented reality device, and simulate virtual wireless signal coverage according to a set position and parameters of the virtual wireless signal source or reflector, and a surrounding environment of the virtual wireless signal source or reflector, and form an augmented reality image accordingly. The user may move in the environment to observe the virtual wireless signal coverage reflected by the augmented reality image at different positions, and may further change parameter settings and positioning of the virtual wireless signal source or reflector, and re-simulate new virtual wireless signal coverage. It should be noted that the marker in the augmented reality image are added to the environment based on an image of the environment seen by the user through the handheld augmented reality device during observation, and therefore the marker added to the environment is related to a position and an angle of observation of the user.

It should be understood that, although this specification is described according to various embodiments, not each embodiment includes only a separate technical solution. The specification is described in such a manner only for the sake of clarity. A person skilled in the art should take the specification as a whole, and the technical solutions in various embodiments may also be appropriately combined to form other implementations that can be understood by the person skilled in the art.

The foregoing are merely specific schematic implementations of the present invention, and are not intended to limit the scope of the present invention. Any equivalent change, modification, and combination made by the person skilled in the art without departing from the conception and principles of the present invention should all fall within the protection scope of the present invention.

What is claimed is:

1. An augmented reality method for simulating a wireless signal, the augmented reality method comprising:
    forming a three-dimensional virtual representation of an environment;
    determining a parameter related to a virtual wireless device, the virtual wireless device being a virtual wireless signal source;
    simulating virtual wireless signal coverage in the three-dimensional virtual representation according to the parameter and a position of the virtual wireless device in the three-dimensional virtual representation, the simulating including,
        calculating a direct signal power level of each respective coordinate among a plurality of coordinates in the three-dimensional virtual representation based on a path loss value and a distance between the respective coordinate and the position of the virtual wireless device, the path loss value being based on the parameter,
        calculating one or more indirect signal power levels of each respective coordinate among the plurality of coordinates based on the path loss value and one or more reflection paths, the one or more reflection paths being between the position of the virtual wireless device and the respective coordinate, and
        calculating a total signal power level of each respective coordinate among the plurality of coordinates as a sum of the direct signal power level of the respective coordinate and the one or more indirect signal power levels of the respective coordinate;

generating an augmented reality image of the environment for display, the augmented reality image including the virtual wireless device and a marker representing the virtual wireless signal coverage; and adjusting a position of a real wireless device in the environment based on the augmented reality image and the virtual wireless signal coverage of the virtual wireless device.

2. The augmented reality method of claim 1, wherein the parameter comprises at least one of a frequency, an antenna type, or an antenna gain of the virtual wireless signal source.

3. The augmented reality method of claim 1, wherein the marker includes one of:
a pattern of the virtual wireless signal coverage on a ground of the environment in the augmented reality image;
the pattern of the virtual wireless signal coverage on a photo of the environment in the augmented reality image; or
a plurality of markers corresponding to a respective virtual wireless signal coverage of each of a plurality of areas of the environment, the virtual wireless signal coverage including the respective virtual wireless signal coverage of each of the plurality of areas.

4. The augmented reality method of claim 1, wherein the forming the three-dimensional virtual representation comprises:
capturing at least two images of a real environment using a camera, the at least two images being captured at different angles and from different positions; and
measuring depth information of each pixel in the at least two images by performing triangulation on a stereo image among the at least two images.

5. The augmented reality method of claim 4, wherein the forming the three-dimensional virtual representation comprises:
training, by using a training set for machine learning, a machine learning algorithm to match optical information included in a respective image and a corresponding material of each surface included in the respective image, and
matching a first material of each surface in the at least two images using the trained machine learning algorithm; and wherein
the simulating simulates the virtual wireless signal coverage in the three-dimensional virtual representation according to the parameter, the position of the virtual wireless device, and the first material of each surface in the at least two images.

6. The augmented reality method of claim 1, wherein the simulating comprises determining the one or more reflection paths using ray tracing.

7. The augmented reality method of claim 3, wherein the marker includes one of
the pattern of the virtual wireless signal coverage on the ground of the environment in the augmented reality image, or
the pattern of the virtual wireless signal coverage on the photo in the augmented reality image; and wherein
a density of lines in the pattern of the virtual wireless signal coverage reflects a degree of signal coverage or signal strength corresponding to the virtual wireless signal coverage.

8. The augmented reality method of claim 3, wherein the marker includes the plurality of markers corresponding to a respective virtual wireless signal coverage of each of the plurality of areas, each of the plurality of markers reflecting a value of signal coverage or a value of signal strength corresponding to the virtual wireless signal coverage.

9. The augmented reality method of claim 1, wherein
the marker reflects a value of signal coverage or a value of signal strength corresponding to the virtual wireless signal coverage; and
the adjusting the position of the real wireless device adjusts the position of the real wireless device in the environment based on the value of signal coverage or the value of signal strength.

10. A non-transitory computer-readable storage medium, storing a computer instruction that, when executed by a processor, causes the processor to perform the augmented reality method of claim 1.

11. The non-transitory computer-readable storage medium of claim 10, wherein the determining the parameter determines the parameter according to an input of a user.

12. An augmented reality device for simulating a wireless signal, the augmented reality device comprising:
an environment capturing module configured to form a three-dimensional virtual representation of an environment;
a setting module configured to determine a parameter related to a virtual wireless device, the virtual wireless device being a virtual wireless signal source;
a wireless signal simulating module configured to simulate virtual wireless signal coverage in the three-dimensional virtual representation according to the parameter and a position of the virtual wireless device in the three-dimensional virtual representation, the wireless signal simulating module further configured to,
calculate a direct signal power level of each respective coordinate among a plurality of coordinates in the three-dimensional virtual representation based on a path loss value and a distance between the respective coordinate and the position of the virtual wireless device, the path loss value being based on the parameter,
calculate one or more indirect signal power levels of each respective coordinate among the plurality of coordinates based on the path loss value and one or more reflection paths, the one or more reflection paths being between the position of the virtual wireless device and the respective coordinate, and
calculate a total signal power level of each respective coordinate among the plurality of coordinates as a sum of the direct signal power level of the respective coordinate and the one or more indirect signal power levels of the respective coordinate; and
an augmenting module configured to generate an augmented reality image of the environment for display, the augmented reality image including the virtual wireless device and a marker representing the virtual wireless signal coverage.

13. An augmented reality device for simulating a wireless signal, the augmented reality device comprising:
a capturing apparatus configured to form a three-dimensional virtual representation of an environment;
a display apparatus configured to display an augmented reality image;
a processor; and a non-transitory computer-readable storage medium storing a computer instruction, wherein
the processor is configured to execute the computer instruction to cause the augmented reality device to
determine a parameter related to a virtual wireless device according to an input of a user, the virtual wireless device being a virtual wireless signal source,
train, by using a training set for machine learning, a machine learning algorithm to match optical information included in a respective image and a corresponding material of each surface included in the respective image,
math a first material of each surface in at least two images using the trained machine learning algorithm,
simulate virtual wireless signal coverage in the three-dimensional virtual representation of the environment according to the parameter, a position of the virtual wireless device in the three-dimensional virtual representation, and the first material of each surface, and
generate an augmented reality image of the environment for display, the augmented reality image including the virtual wireless device and a marker representing the virtual wireless signal coverage.

14. The augmented reality device of claim 13, wherein the capturing apparatus and the display apparatus have a common display configured to display a real environment in the augmented reality image; or the capturing apparatus includes a first device configured to display the environment for capturing and the display apparatus includes a second device configured to display the augmented reality image.

15. The augmented reality device of claim 13, wherein the capturing apparatus includes
a plurality of cameras arranged to correspond to different positions and different shooting angles, or
a first camera and an inertial sensor, the inertial sensor being configured to measure motion of the first camera during shooting;
the processor is configured to execute the computer instruction to cause the augmented reality device to measure depth information of each pixel in at least two images by performing triangulation on a stereo image among the at least two images; and
the capturing apparatus is configured to form the three-dimensional virtual representation based on the depth information and two-dimensional information in the at least two images.

16. A non-transitory computer-readable storage medium, storing a computer instruction that, when executed by a processor, causes the processor to perform the augmented reality method of claim 2.

17. The non-transitory computer-readable storage medium of claim 16, wherein the determining the parameter determines the parameter according to an input of a user.

* * * * *